Patented Mar. 19, 1946

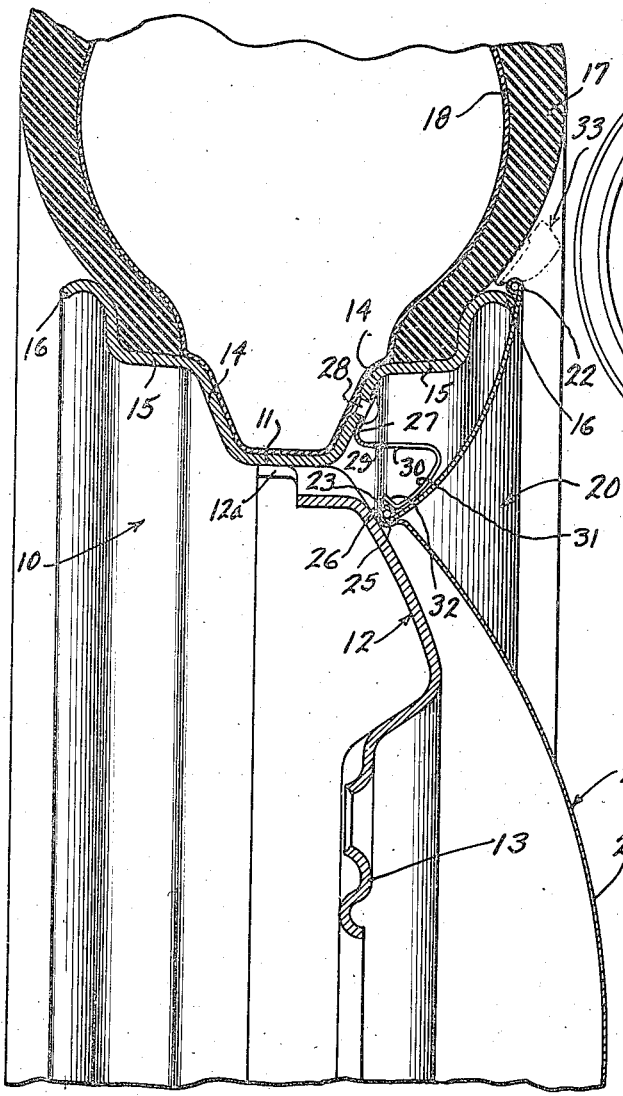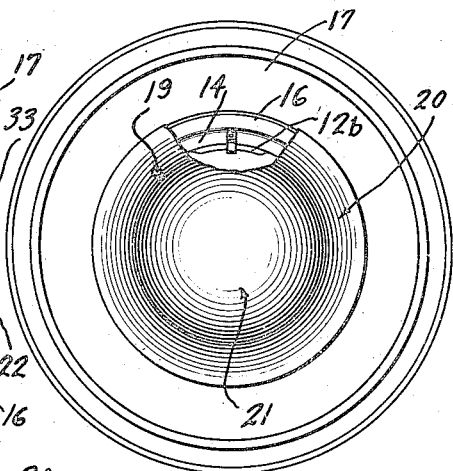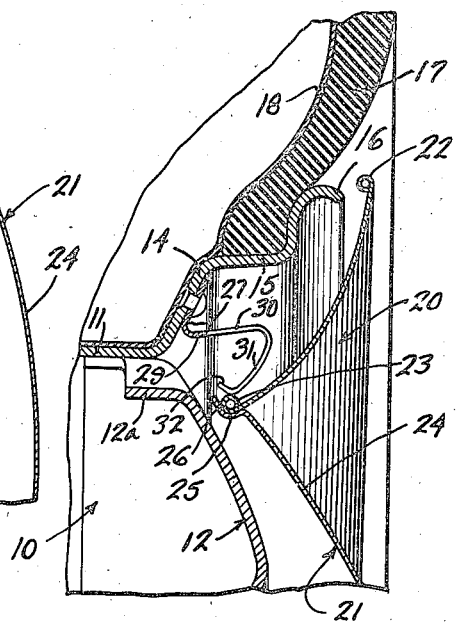

2,397,024

UNITED STATES PATENT OFFICE 2,397,024

WHEEL STRUCTURE

George Albert Lyon, Allenhurst, N. J.

Application September 6, 1943, Serial No. 501,348

3 Claims. (Cl. 301—37)

This invention is directed to an improved wheel assembly and relates more particularly to an improved cover assembly therefor.

It is an important object of the present invention to provide for a multi-part cover assembly arranged for disposition over the outer side of a wheel structure, improved retaining means for maintaining the same thereon in detachable relationship thereto.

It is another important object of the present invention to provide a multi-part cover assembly for disposition over the outer side of a wheel structure in which the parts are so constructed and arranged that during a pry-off operation the pry-off stresses are applied solely to one of the members whereby the other member may be removed therewith without being subjected to undue stress and strain.

It is another object of the invention to provide for disposition over the outer side of a wheel structure, a multi-part cover assembly including a radially outer annular portion constructed from relatively rigid material such as thin sheet metal or the like and a central circular hub cap member constructed from synthetic sheet plastic material or the like, and having physical characteristics enabling it to be self-supporting as to form and yet locally resiliently flexible whereby it returns to its initial position upon the release of distorting forces therefrom, said cover portions being so associated with each other and so retained upon the wheel structure that pry-off forces applied to the radially outer portion of the metallic annular cover part will effect removal of the entire cover assembly from the wheel structure without the imposition of undue stresses and strains upon the central plastic hub cap simulating cover member.

It is still another object of the invention to provide a multi-part cover assembly for disposition over the outer side of a wheel structure including an outer annular portion and a central circular hub cap portion, said latter portion being constructed from sheet synthetic plastic material and having physical characteristics enabling it to be self-supporting as to form and yet resiliently yieldable, the said cover portions being so arranged and maintained upon the wheel structure that a portion of the central hub cap member is sandwiched between normally engaging metallic parts of the assembly, thereby to greatly reduce the development of vibration and rattle between the metal parts.

It is still another object of the invention to provide a cover assembly for disposition over the outer side of a wheel structure with novel retaining means so arranged as to retainingly engage a portion of the cover and so as to serve as a backing, supporting instrumentality for the same when retained upon the wheel structure.

In accordance with the general features of the invention, there is provided herein a cover assembly including a radially outer annular cover part formed from relatively rigid material such as sheet metal or the like, and a central circular hub cap member formed from synthetic plastic sheet material or the like, said hub cap member being formed at the radially outer margin thereof to retainingly engage with the annular hub cap member for disposal over the outer side of a wheel structure including a tire rim and a central load bearing portion, there being retaining means secured to the tire rim and having circumferentially spaced generally axially outwardly extending retaining fingers thereon, said fingers being adapted to retainingly engage the junction between the cover parts and having portions extending generally radially outwardly in surface engagement behind the cover to supportingly reinforce the same.

Other objects and advantages of the invention will become apparent from the following description and accompanying drawing, in which:

Figure 1 is a side elevational view with parts broken away for illustrative purposes of a wheel structure embodying my invention;

Figure 2 is a fragmentary radial cross-sectional view of a wheel structure embodying my invention as shown in Figure 1;

Figure 3 is a fragmentary radial cross-sectional view of the structure shown in Figure 2 in partially assembled relationship.

It will be understood that the embodiments shown herein are for illustrative purposes only and may be changed or modified without departing from the spirit and scope of the invention as set forth in the appended claims.

The wheel structure shown herein as associated with the cover assembly embodying my invention, includes a tire rim 10 having a base flange 11 and a central load bearing portion 12 attached thereto by means of a generally axially inwardly extending flange 12a provided at the radially outer margin thereof. The base flange 11 and the flange 12a may be secured together as by riveting or welding or the like.

The central load bearing portion 12 is further provided at the radially inner part thereof with a bolt-on flange 13 by means of which the wheel structure may be secured to an appropriate part of a vehicle such as the brake drum or the like.

The tire rim 10 is further provided with opposite side wall flanges 14, opposite intermediate flanges 15 and opposite edge portions 16 between which may be disposed the radially inner parts of a tire 17 having an inner tube 18 provided with a suitable valve stem 19 which protrudes through an aperture in the cover assembly to be described presently, as will be seen in Figure 1.

The cover assembly disclosed herein includes a radially outer annular cover member 20 and a central circular hub cap simulating cover member 21. As will be seen from Figure 2, the cover member 20 is provided with a cross-sectional configuration and expanse whereby it extends radially over the entire outer side of the outer surface of the flanges of the tire rim 10 from the edge portion thereof to a point on the wheel radially inwardly of the junction on the tire rim with the central load bearing portion 12. Furthermore, the cover member 20 is provided with a cross-sectional configuration whereby it substantially simulates the curvature of the side wall of the tire 17, thus to give the appearance of being a continuation thereof and a part thereof and particularly to appear as the white side wall of a massive tire when colored white.

Preferably the cover member 20 is formed from a relatively rigid material such as sheet metal or the like for purposes to be explained presently and as will be seen from Figure 2 is provided at the radially outer and inner margins thereof with beads 22 and 23 respectively, the beads 22 being arranged to overlie the radially outer surface of the extreme edge of the edge portion 16 of the tire rim, while the bead 23 is utilized for retaining the cover assembly together and for maintaining the same upon the wheel structure in a manner to be presently described.

The cover member 21 is provided with a central crown part 24 and is formed at the radially outer margin thereof to provide a curvate portion 25 affording a radially outwardly opening channel for receiving the bead 23 of the cover member 20 and a generally radially outwardly extending terminal flange 26 arranged to overlie the axially inner face of the bead 23.

Suitable means is provided on the wheel structure for retaining the assembled cover members on the wheel structure. In the present embodiment this means includes an annulus having a flange 27 arranged for disposal in surface engagement with one of the side wall flanges 14 and welded or riveted thereto as shown at 28. The flange 27 terminates at its radially inner portion in a flange 29 which in the present instance, extends generally axially outwardly and terminates in circumferentially spaced circularly disposed resilient retaining elements including generally axially outwardly extending arms 30, turned back portions 31 extending radially inwardly, axially inwardly and obliquely arranged so that a portion thereof extends in surface engagement with the rear surface of the inner marginal portion of the cover member 20. The portions 31 terminate in radially outwardly, axially inwardly, obliquely disposed terminal fingers 32, there being a radially inwardly extending peak on each of the retaining elements between the respective terminals 32 and portions 31 thereof.

From the foregoing, it will be seen that I have provided a multi-part cover assembly in which the bead 23 of the outer, rigid annular portion 20 rests in a radially outwardly extending circular groove or channel of the central, relatively frangible member 21, this relationship being such that it is maintained by the parts when they are independent of the wheel structure and unattached thereto.

In assembling the cover unit on the wheel structure, it will be seen from Figure 3 that when the assembled cover members 20 and 21 are aligned concentrically with the wheel structure as a unit and urged axially inwardly thereagainst, the bead 23 of the cover member 20, which describes a circle of greater diameter than that described by the radially inwardly extending peaks of the resilient clip members when disposed in a position shown in Figure 2, bears against the respective clip members and particularly against the radially inner part of the portions 31 thereof, thereby springing them radially outwardly until the bead 23 has passed the radially inwardly peak and engages the terminal portions 32 thereof. This position having been obtained, it will be seen from Figure 2 that the terminal portions 32 bear against the outer side of the bead 23 to press the same against the flange 26 of the cover member 24 and thus against the adjacent portion of the outer surface of the central load bearing portion 12 of the wheel to securely maintain the cover assembly in detachable engagement with the wheel structure.

It is in the removal of the cover assembly from the wheel structure that the attributes of my present invention are particularly realized. In order to assure the secure maintenance of the cover assembly upon the wheel structure, during use, it is necessary that the retaining means, whatever the nature thereof may be, engage and hold the cover with considerable force. In the present instance, it will be seen that the circumferentially spaced retaining clips, being formed from metal strips, will bear with considerable force radially inwardly to urge the terminal portions 32 against the bead 23 of the cover member 20. Therefore it will be seen that in removing the cover assembly by a pry-off operation, considerable strain is imposed upon the radially outer part of the cover assembly when the radially outer margin thereof is engaged by the fingers and drawn axially outwardly as indicated at 33 in Figure 2.

With the present construction, however, the frangible portion 21 of the cover is retainingly engaged by the radially inner margin of the metallic cover 20 and it is against the latter that the withdrawing forces are imposed to draw the bead axially outwardly beyond the retaining elements and thus spring the latter radially outwardly to permit this withdrawal operation. Thus it will be seen that during the removal of the cover from the wheel structure by virtue of a pry-off operation, the relatively rigid annular cover member 20 serves to bear the removal stresses imposed and thus protects the cover member 21 and yet withdraws the same as a unitary part of the cover.

It will be understood, of course, that the cover assembly disclosed herein as an embodiment of my invention may be associated with vehicle wheels differing from that disclosed herein. It will also be noted that the flange 12a of the body part 12 may be radially inwardly depressed at circumferentially spaced portions thereof to afford circumferentially spaced apertures as shown at 12b in Figure 1, whereby circulation of air may take place. With such a wheel structure, it is desirable that the passage of dirt and gravel through the apertures 12b be prevented and in the present construction it will be seen that the junction between the cover parts is such that passage of dirt and gravel therethrough is impossible because of the complete closure obtained.

What I claim is:

1. In a wheel structure having a multi-flanged tire rim and a central load bearing portion, resilient, circumferentially spaced, circularly disposed retaining means arranged on the outer side of the wheel structure and a multi-part cover assembly including an outer annular metallic member arranged to be disposed over the outer side of the tire rim to conceal the same and a central circular hub cap simulating member formed from synthetic plastic material and having physical characteristics enabling it to be self-supporting as to form and yet resiliently, locally flexible to immediately snap back to its original position upon release of distorting pressures therefrom, said circular cover member being provided at the radially outer margin thereof with a circular outwardly facing groove and said annular cover member being provided at the radially inner edge thereof with a generally axially inwardly extending part arranged to be disposed in said groove of the circular cover to afford a unitary multi-part cover assembly, said generally axially inwardly extending margin of the annular metallic cover member being arranged for engagement in snap on pry off relationship with the resilient retaining means of the wheel structure.

2. In a wheel structure having a multi-flanged tire rim and a central load bearing portion, and resilient, circumferentially spaced, circularly disposed retaining means arranged on the outer side of the wheel structure a multi-part cover assembly including an outer annular metallic member arranged to be disposed over the outer side of the tire rim to conceal the same and a central circular hub cap simulating member formed from synthetic plastic material and having physical characteristics enabling it to be self-supporting as to form and yet resiliently, locally flexible to immediately snap back to its original position upon release of distorting pressures therefrom, said circular cover member being provided at the radially outer margin thereof with a circular outwardly facing groove and said annular cover member being provided at the radially inner edge thereof with a generally axially inwardly extending part arranged to be disposed in said groove of the circular cover member to afford a unitary multi-part cover assembly, said generally axially inwardly extending margin of the annular metallic cover member being arranged for engagement in snap on pry off relationship with the resilient retaining means of the wheel structure, said retaining means on the wheel structure being arranged to spring radially outwardly to afford passage of the engaging portion of the annular cover member in an axial direction thereby and also being arranged to spring radially outwardly over the axially outer side of said engaging portion of the annular cover member to maintain assembled relationship between the cover and the wheel.

3. In a cover structure for a wheel including a tire rim part and a body part, concentric radially inner and outer circular cover members, said inner cover member having a radially outwardly facing groove and said outer cover member having a rearwardly turned bead seated in said groove, and resilient retaining means on one of said wheel parts behind said outer cover member including a resilient leg directly opposite and bearing radially inwardly against said bead to retain it in said groove.

GEORGE ALBERT LYON.